Patented Nov. 15, 1932

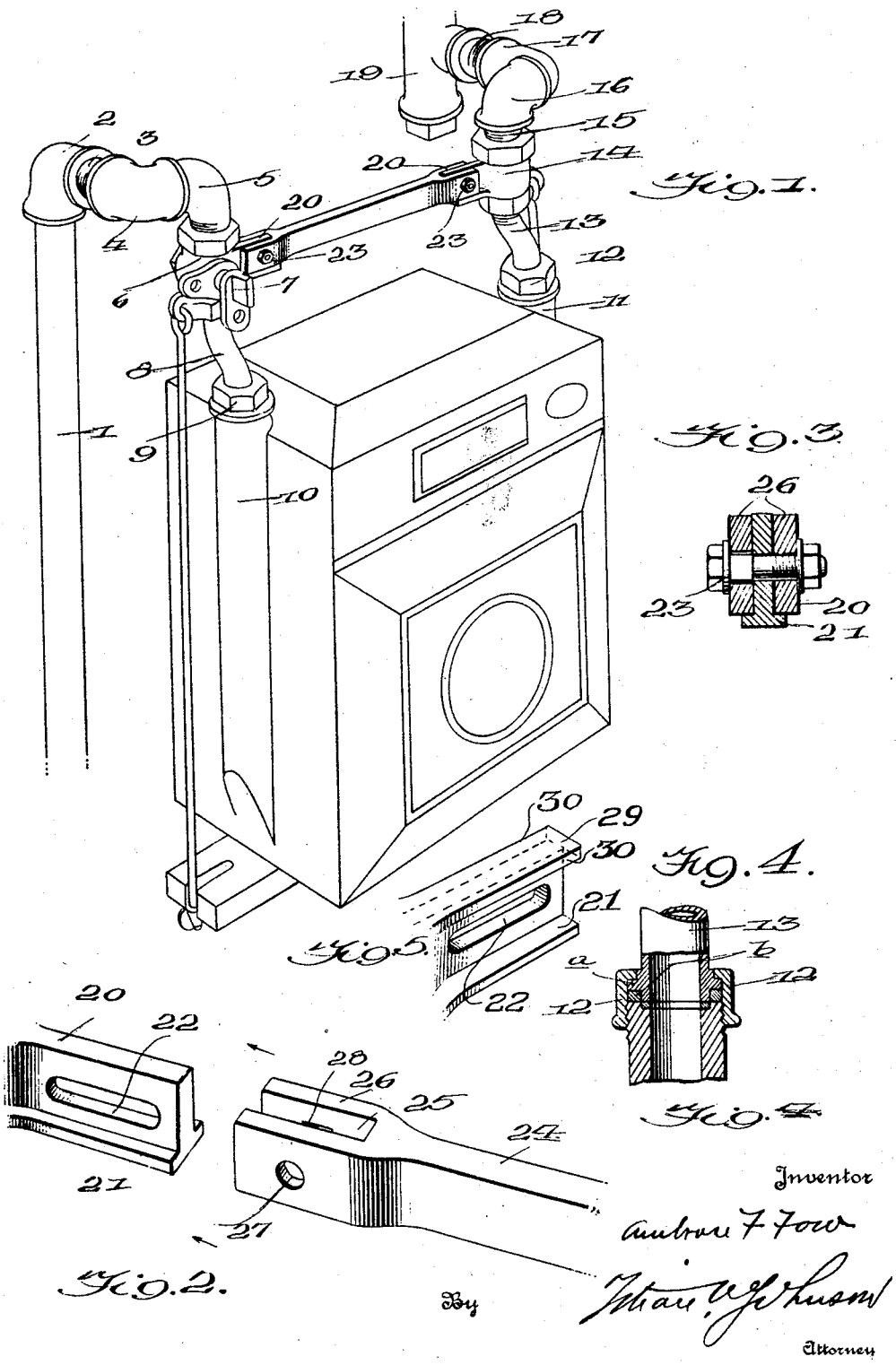

1,887,999

UNITED STATES PATENT OFFICE

AMBROSE F. FOW, OF PHILADELPHIA, PENNSYLVANIA, ASSIGNOR TO KITSON COMPANY, OF PHILADELPHIA, PENNSYLVANIA, A CORPORATION OF WEST VIRGINIA

BRACE OR TIE-IN BAR FOR GAS METERS

Application filed October 15, 1929. Serial No. 399,866.

This invention relates to a brace or tie-in bar for gas meters.

The gas meters now commonly in use are provided with inlet and outlet pipes, the inlet pipe being soldered to one side of the casing and the outlet pipe to the other. These pipes are more or less fragile and liable to be ruptured if any unusual or unintended strain is placed upon them either during the installation of the meter or thereafter. Furthermore it is common under present practice to hang or support the whole meter from the service pipe and house pipe, which pipes are in turn supported in various ways in the building as may appear most convenient and advantageous as dictated by the conditions characterized by the location of the installation. In the usual installation there are provided couplings which are, by suitable unions or nipples, attached to or connected with the upper ends of the meter pipes. It is important that a strong rigid bar or tie be provided between these couplings so that should the house pipes become dislodged from the original position from any cause whatsoever, no strain will be transmitted to the meter pipes.

In view of these necessities as above outlined, my object is to provide a brace or tie-in bar of a specially rigid character which will be for all practical purposes incapable of any deformation or in fact distortion of any character after it has once been secured in place, in the manner which will be described.

A further object is to form a bar that will cooperate with the seats on the couplings in such a way that there will be no possibility of the ends of the bar rocking in the seats after the bolts connecting the bar with the seats have been drawn up, even though a bolt should thereafter become slightly loosened.

Referring to the drawing:

Figure 1 is a perspective view of the meter assemblage in which my improved bar is included.

Figure 2 is a disassembled perspective view of the bar or brace and seat on the coupling.

Figure 3 is a section through the end of the bar and seat on the coupling.

Figure 4 is a sectional view of the upper end of one of the meter pipes showing the manner of connecting the coupling with said pipe.

Figure 5 is a detailed perspective view of a modified form of ear forming a part of the couplings.

In the drawing the numeral 1 designates the service pipe leading from the gas main. In the approved meter hook-up such as is illustrated this pipe is provided at its upper end with an elbow 2 connected by a nipple 3 to an elbow 4 which in turn receives another elbow fitting 5 which is threaded into the meter coupling 6 at the inlet side of the meter, which is provided with the usual gas cock 7. Threaded into the lower end of this coupling is a gooseneck nipple 8 carrying at its lower end a union 9 by which the coupling is connected with the inlet pipe 10 of the meter. At the opposite side of the meter is the outlet pipe 11 connected by union 12 and gooseneck nipple 13 with meter coupling 14. To this coupling is connected by a threaded nipple 15 an elbow 16, which elbow is connected to another elbow 17. The elbow 17 is connected by a nipple 18 with the fitting 19 which may be of any kind suitable for connection with other pipes and fittings leading to another meter or meters which may be in the same series. The couplings 6 and 14 are provided with ears 20 which are identical, and each is provided at its lower edge with laterally extending ledges or flanges 21 which form seats for the brace or tie-in rod presently to be described. Each ear is provided with an elongated slot 22 for the passage of a bolt 23 by which the bar is secured firmly to the seats in the ears, the elongation of the slots in the ears permitting lateral adjustment of the bar on the seats in the installation of the meter.

The numeral 24 designates the tie-bar, bifurcated at its end as indicated at 25, the furcation 26 of the bar ends being adapted to rest upon the ledges 21 of the ears 20 of the meter couplings. The furcations of the bar are provided with oppositely disposed openings 27 and 28 for the passage of bolts whose shanks pass through the slot provided in each of the coupling ears. The aperture 28 is preferably square, so that a carriage bolt, (which is a bolt having a squared portion adjacent its head to prevent the bolt from turning when the nut is threaded on the bolt) or an ordinary machine bolt, whose shank will be of such size as to enable it to pass through both of the openings, may be used.

The fittings employed are, in the main, ordinary stock fittings, which are threaded into each other and are capable of all of the adjustments necessary to so position them for the convenient attachment of the meter in the operation of installation. By the aid of a suitable wrench the couplings 6 and 14 are brought opposite each other with the ears 20 in accurate alinement. The furcations of the bar ends are then, by a downward movement, seated on the ledges 21 of the ears and the bolts tightened, thus establishing an absolutely rigid connection between the couplings and virtually converting them into an integral structure. Thereafter, the gooseneck nipples 8 and 13, which are threaded into the couplings at their upper ends, and consequently capable of a swinging movement, (by the aid of a suitable wrench) are manipulated until the lower ends of the said nipples are accurately positioned over the upper ends of the inlet and outlet pipes of the meter and faced accurately therewith. The installation is completed by the tightening up of the unions.

By reference to Figure 4 it will be noted that the lower end of the nipple 13 (which is identical with the nipple 8) is provided with an annular flange $a$, which is embraced by a union 12. Interposed between the flange and the upper face of the outlet pipe 11 is a leather washer $b$. Should there be any slight irregularity or unevenness between the nipple and the meter pipe ends, this irregularity is readily taken care of by the washer. It will be understood that the connections between the nipples 8 and 13 and the meter pipes and their construction, are the same.

It will be noted that the ends of the bar are broadened, thereby giving a greater bearing surface between the bar ends and the ears.

A further advantage derived from the peculiar formation of the ends of the bar is that a rigid connection will be formed against any tendency to torsionally twist the bar on its seats and to prevent the separation of the couplings 6 and 14, even though a bolt should become slightly loosened.

Referring to Figure 5, which illustrates a modified form of an ear carried by the couplings the numeral 29 designates the top of the ear provided in this instance, with oppositely extending flanges 30. In this form, the furcations of the bar will slide laterally into the seats in the ears, which may be brought about by swinging of the couplings toward each other at the proper stage of the installation, such swinging movement of the couplings being made possible by the employment of the nipples 3 and 18.

I claim:—

The combination of a pair of pipe fittings having alined vertical integral ears projecting from respective fittings toward each other; of a rigid tie-bar having forked ends, each straddling a respective ear and fitting closely thereon, said ears each having a lateral flange extending along its edges on each side thereof and engaged by the lower edges of the forked portion of the bar in selected upright and inverted position of the bar, and means for securing the tie-bar ends in position on said ears.

In testimony whereof I affix my signature.

AMBROSE F. FOW.